(12) United States Patent
Justiss et al.

(10) Patent No.: US 7,251,708 B1
(45) Date of Patent: Jul. 31, 2007

(54) SYSTEM AND METHOD FOR MAINTAINING AND REPORTING A LOG OF MULTI-THREADED BACKUPS

(75) Inventors: Steven A. Justiss, Lakeway, TX (US); Robert Sims, Round Rock, TX (US)

(73) Assignee: Crossroads Systems, Inc., Austin, TX (US)

( * ) Notice: Subject to any disclaimer, the term of this patent is extended or adjusted under 35 U.S.C. 154(b) by 314 days.

(21) Appl. No.: 10/636,042

(22) Filed: Aug. 7, 2003

(51) Int. Cl.
*G06F 12/00* (2006.01)

(52) U.S. Cl. ................ 711/111; 711/162; 711/4; 707/7

(58) Field of Classification Search ............ None
See application file for complete search history.

(56) References Cited

U.S. PATENT DOCUMENTS

| | | | |
|---|---|---|---|
| 5,515,502 A | | 5/1996 | Wood |
| 5,576,903 A * | | 11/1996 | Brown et al. .............. 360/48 |
| 5,950,218 A * | | 9/1999 | Howard .................... 711/4 |
| 5,974,563 A | | 10/1999 | Beeler, Jr. |
| 6,038,613 A | | 3/2000 | Garcia et al. |
| 6,049,848 A * | | 4/2000 | Yates et al. .............. 711/4 |
| 6,058,389 A * | | 5/2000 | Chandra et al. ........... 707/1 |
| 6,076,148 A | | 6/2000 | Kedem |
| 6,219,770 B1 | | 4/2001 | Landau |
| 6,397,309 B2 | | 5/2002 | Kedem et al. |
| 6,400,730 B1 | | 6/2002 | Latif et al. |
| 6,415,296 B1 | | 7/2002 | Challener et al. |
| 6,460,113 B1 | | 10/2002 | Schubert et al. |
| 6,487,644 B1 | | 11/2002 | Huebsch et al. |
| 6,505,216 B1 | | 1/2003 | Schutzman et al. |
| 6,532,124 B1 * | | 3/2003 | Abe .......................... 360/48 |
| 6,622,142 B1 * | | 9/2003 | Murray et al. ............ 707/100 |
| 6,675,257 B1 * | | 1/2004 | Khalid et al. ............. 711/111 |
| 6,757,794 B2 * | | 6/2004 | Cabrera et al. ........... 711/156 |
| 6,892,199 B2 * | | 5/2005 | Hong et al. ............... 707/7 |
| 6,922,761 B2 * | | 7/2005 | O'Connell et al. ........ 711/162 |
| 6,931,501 B1 * | | 8/2005 | Narayanaswamy et al. . 711/158 |
| 6,973,455 B1 * | | 12/2005 | Vahalia et al. ............ 707/8 |
| 7,051,173 B2 * | | 5/2006 | Tsuchiya et al. .......... 711/162 |

(Continued)

OTHER PUBLICATIONS

Microsoft Tape Format Specification Version 1.00a . Sep. 15, 2000. pp. 13-21.*

(Continued)

*Primary Examiner*—Hyung Sough
*Assistant Examiner*—Kaushik Patel
(74) *Attorney, Agent, or Firm*—Sprinkle IP Law Group

(57) ABSTRACT

Systems and methods for performing multi-threaded backups and restores. In one embodiment, a log is maintained to record the source of write commands, and the order in which blocks of data are written to a sequential storage device. The source identification of the write command may consist of such identifiers as a protocol dependent Host ID, the extended-copy-specification-defined List ID, a time stamp, and the size of the backup medium block written. The order in which the data is written to the backup medium can be identified with these same Host ID and List ID numbers. When it is desired to restore data corresponding to one of the threads, the desired blocks of data can be identified in the log, and the preceding blocks stored on the backup medium can be skipped.

22 Claims, 5 Drawing Sheets

U.S. PATENT DOCUMENTS

| | | |
|---|---|---|
| 2001/0042222 A1 | 11/2001 | Kedem et al. |
| 2002/0004857 A1 | 1/2002 | Arakawa |
| 2002/0042866 A1 | 4/2002 | Grant et al. |
| 2002/0083281 A1 | 6/2002 | Carteau |
| 2002/0144069 A1 | 10/2002 | Arakawa et al. |
| 2002/0146035 A1 | 10/2002 | Tyndall |
| 2002/0156942 A1 | 10/2002 | Tyndall |
| 2002/0184463 A1 | 12/2002 | Arakawa et al. |
| 2002/0188697 A1 | 12/2002 | O'Connor |
| 2002/0199073 A1 | 12/2002 | Tamura et al. |
| 2003/0014433 A1 | 1/2003 | Teloh et al. |
| 2003/0014534 A1 | 1/2003 | Watanabe et al. |
| 2003/0018657 A1 | 1/2003 | Monday |
| 2003/0212700 A1 | 11/2003 | Basham |
| 2004/0107226 A1* | 6/2004 | Autrey et al. ............... 707/204 |
| 2004/0148283 A1* | 7/2004 | Harris et al. .................. 707/5 |
| 2004/0236868 A1* | 11/2004 | Martin et al. ............... 709/245 |
| 2004/0243736 A1* | 12/2004 | Hattrup et al. ................ 710/15 |
| 2005/0076264 A1* | 4/2005 | Rowan et al. ................. 714/6 |
| 2005/0165868 A1* | 7/2005 | Prakash ...................... 707/204 |
| 2005/0172093 A1* | 8/2005 | Jain ........................... 711/162 |

OTHER PUBLICATIONS

Wilson, Extended Copy Command, T10, found at http://www.T10.org/, 34 pgs, Apr. 1999.

Exabyte Corporation, "Why Choose Native Fibre Backup?", 11 pgs.

ATTO Technology Inc., "Intelligent Bridging Architecture", 9 pgs, Jun. 2002.

\* cited by examiner

SYSTEM AND METHOD FOR MAINTAINING AND REPORTING A LOG OF MULTI-THREADED BACKUPS

FIELD OF THE INVENTION

The invention relates generally to storage and retrieval of data and more particularly to improved systems and methods for retrieving data from a sequential storage device, where the data was contained in one of multiple threads that were stored on the device in an intermingled fashion.

RELATED ART

The NCITS T10 SPC-2 (SCSI Primary Commands-2) Extended Copy command provides a method for computer backup applications to delegate actual data movement to "third party devices" known as copy managers. These copy managers typically reside in mass storage related, microprocessor-based, storage network attached devices.

Copy managers move data from source devices to destination devices as designated by the backup application in "segment descriptors" which in part constitute the parameter list of the Extended Copy command. To enable restoration of the data each block of real data is paired with "metadata" which contains identifying information about the real data, allowing its proper restoration from the backup medium.

The standard contemplates that a copy manager may handle some number of "concurrent" Extended Copy sessions depending on the size and number of system resources available. (The standard provides a method of reporting to the application the number of concurrent Extended Copy commands the copy manager can handle.)

Computer software data backup applications may initiate multiple backup threads that store data from different sources onto one backup medium (such as a tape, or optical disk). These backup applications may operate in a standalone configuration (storage devices directly attached to the host computer), or in a networked storage configuration (storage devices attached to a network, along with the host computer). The backup applications may transfer the data of backup threads directly to the storage media (such as in direct-attached, or in "lan-free" backups), or make use of "third party copy" backup strategies.

When the backup medium is tape, the copy manager strives to keep a tape drive streaming (continuously moving the tape, writing data to the tape) in order to maximize performance. To keep the tape drive streaming the copy manager generally implements some form of disk data prefetch, or "read-ahead", so that the copy manager has data in buffers ready to build the next tape write command when an active tape write command completes.

An alternative means of keeping a tape drive streaming utilizes concurrent Extended Copy command-produced tape writes which are multi-threaded onto one tape (an invention described in a separate disclosure, namely "Method for Multi-threaded Extended Copy Backup to One Tape Drive"). Host applications may find it difficult to properly restore a backup medium written in this fashion.

SUMMARY

One or more of the problems outlined above may be solved by the various embodiments of the invention. Broadly speaking, the invention comprises systems and methods for performing multi-threaded backups and restores.

In one embodiment, a log is maintained to record the source of write commands, and the order in which blocks of data are written to the backup medium. The source identification of the write command may consist of such identifiers as a protocol dependent Host ID, the extended-copy-specification-defined List ID, a time stamp, and the size of the backup medium block written. The order in which the data is written to the backup medium can be identified with these same Host ID and List ID numbers. In other words, as blocks of data from each thread are written, the thread and the number of blocks is identified in the log. Then, when it is desired to restore data corresponding to one of the threads, the desired blocks of data can be identified in the log, and the preceding blocks stored on the backup medium can be skipped.

One embodiment of the invention is a method comprising generating a write log, wherein the write log identifies a sequence in which blocks of data corresponding to multiple write threads are stored on a sequential device, reading the log, identifying at least a portion of the blocks of data corresponding to one of the write threads and indexing to the location of the identified portion of the blocks of data in the sequence of blocks of data stored onto the sequential device according to the write log. Another embodiment comprises a method similar to that described above, but wherein the write log was previously generated, and the method comprises reading the log, identifying the desired data in the log, indexing to the location of the data on the sequential device as indicated in the log and retrieving the data from the sequential device.

One embodiment of the invention comprises a system for managing blocks of data on a sequential storage device, wherein blocks of data corresponding to multiple threads are stored on the sequential storage device in an intermingled fashion, comprising a sequential storage device configured to store intermingled blocks of data corresponding to multiple threads and a copy manager coupled to the sequential storage device and configured to manage the retrieval of copying of desired blocks of data from the sequential storage device. The system may also include a memory coupled to the copy manager and configured to store a sequence in which blocks of data corresponding to multiple threads are stored on the sequential storage device. The copy manager is configured to identify the position of the desired blocks of data in the sequence stored in the memory, to advance to a corresponding storage location on the sequential storage device without reading each of the preceding stored blocks of data, and to retrieve the desired blocks of data from the sequential storage device.

Another embodiment of the invention comprises a software application. The software application is embodied in a storage medium readable by a computer or other data processor, such as a floppy disk, CD-ROM, DVD-ROM, RAM, ROM, or the like. The storage medium contains instructions which are configured to cause a data processor such as a router or other SAN component to execute a method which is generally as described above. It should be noted that the storage medium may comprise a RAM or other memory which forms part of a data processor. The data processor would thereby be enabled to perform a method in accordance with the present disclosure.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
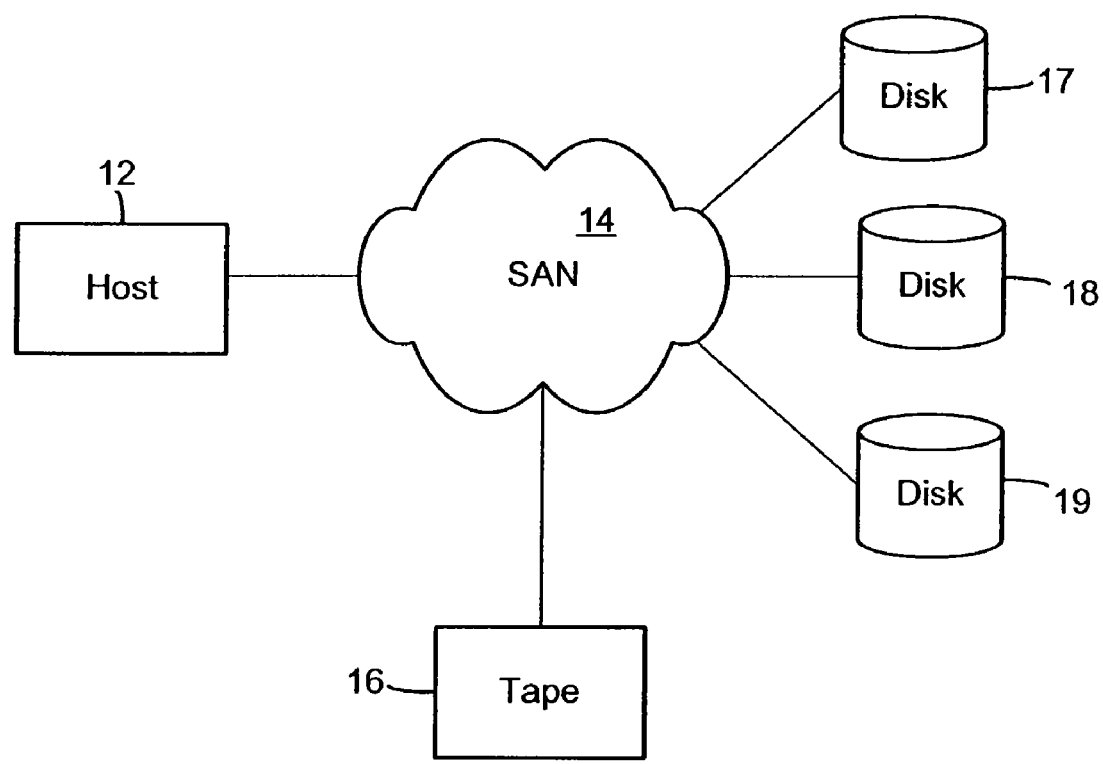
FIG. 1 is a diagram illustrating the interconnection of the network components in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for performing storage and/or retrieval of data blocks corresponding to multiple threads, where the blocks of data corresponding to different threads are intermingled on a sequential storage device.

One embodiment of the invention is implemented in the switching fabric of a storage area network (SAN). Referring to FIG. 1, a block diagram illustrating the interconnection of the network components in one embodiment is shown. In this embodiment, host 12 is coupled to a switch fabric 14. Multiple devices such as disk drives 17, 18 and 19, as well as sequential storage device 16 are also coupled to switch fabric 14.

Host 12 may be any of a variety of devices, such as a Solaris box, a Windows 2000 server, or the like. Devices 17-19 may likewise comprise several types of devices from which data may need to be copied. For example, in one embodiment, devices 17-19 may all be hard disk drives that need to be backed up. Sequential storage device 16 may also be one of several different types of storage devices. Typically, sequential storage device 16 is a tape drive. In an alternative embodiment, it might be an optical drive.

It should be noted that switch fabric 14 may have many different configurations. For example, it may comprise a router or various other types of SAN attached appliances. Switch fabric 14 may be coupled to host 12, devices 17-19 and sequential storage device 16 via various types of interconnects. For instance they may comprise Fibre Channel, SCSI, iSCSI, InfiniBand, or any other type of interconnect that allows transport of INCITS T10 SCSI extended copy commands.

Host 12 is capable of accessing the other components of the network via switch fabric 14. Particularly, host 12 is capable of accessing a copy manager application resident in one of the components of switch fabric 14 to delegate to it the management of copy tasks involving other network components. For example, host 12 might delegate the task of backing up data from devices 17-19 to sequential storage device 16. This is accomplished through the use of extended copy commands issued by host 12 to the copy manager. The copy manager executes these extended copy commands, reading data from devices 17-19 and writing (copying) the data to sequential storage device 16.

The use of extended copy commands allows host 12 to use its own processing power on tasks other than the mere movement of data between network components. For example, it is possible for host 12 to back up a hard disk drive to a tape drive (a potentially very lengthy process) by issuing one or more corresponding extended copy commands to the copy manager. The copy manager can then copy the backup data from the hard disk drive to the tape drive without the intervention of host 12.

Figure 2:
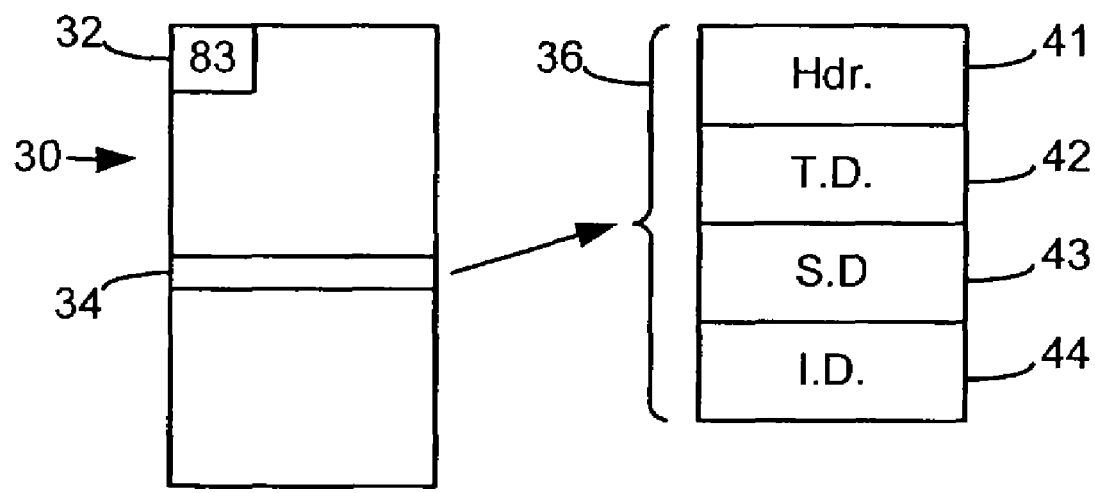
FIG. 2 is a diagram illustrating the general structure of an extended copy command in one embodiment.

Referring to FIG. 2, a diagram illustrating the general structure of an extended copy command in one embodiment is shown. As shown in the figure, the extended copy command 30 has an opcode 32. In this instance, the opcode is a hexadecimal "83". The command format includes a count 34 of the size of a list 36 in the data. List 36 has a header 41, a set of target descriptors 42, a set of segment descriptors 43 and in-line data 44.

The target descriptors 42 describe the target devices which will be involved in the extended copy task. The target devices normally include the source device and the destination device (i.e., the device from which data will be read and the device to which the data will be written). There may, however, be additional target descriptors, and the preferred embodiment makes provision for up to 64 target descriptors. Parameters in the target descriptor list may include such things as the address, name, size of data blocks, fixed-/variable-block mode, etc. for the target device.

The segment descriptors 43 describe the types of operations that will be performed, as well as the amount of data that will be transferred. For example, a segment descriptor may indicate that a block of data will be read from a hard disk drive and written to a tape drive (both of which are referenced by the target descriptors), that is, a backup operation. Alternatively, the segment descriptors may describe backup operations, restore operations, block-to-block operations, etc. It should be noted that inline data (which may also be referred to as metadata) may or may not be present. Typically, for operations such as the backup of a disk to tape, the inline data is present. Metadata may also be present as SPC-2-defined "embedded data". A preferred embodiment is an SPC-2 implementation which supports 8448 segment descriptors. Each of the segment descriptors can move up to 32 MB of data. Thus, a very large amount of data may potentially be moved through a single extended copy command.

In the preferred embodiment, the data is not read or written in 32 MB chunks. The data is instead read from a disk in chunks of 256 kB and then written to a tape in chunks of 64 kB. Internal buffers used in the preferred embodiment are 16 kB each, so each read command to the disk requires 16 buffers and each write command to the tape requires four buffers. This information is used to determine whether sufficient resources are available to activate additional extended copy commands.

In one embodiment, the network component in which the copy manager resides employs buffers to store data that is read from the source device prior to writing it to the destination device. In this embodiment, the buffers in which the data is stored have a low-water mark associated with them. After one or more read commands are issued and the corresponding data fills the buffers, write commands are issued to transfer data from the internal buffers to the destination device. These write operations continue until the number of buffers which contain data (which has not yet been transferred to the destination device) falls below the predetermined low-water mark. When the level of data in the buffers falls below the low-water mark, additional read commands are issued to obtain more data and store it in the buffers.

Figure 3A:
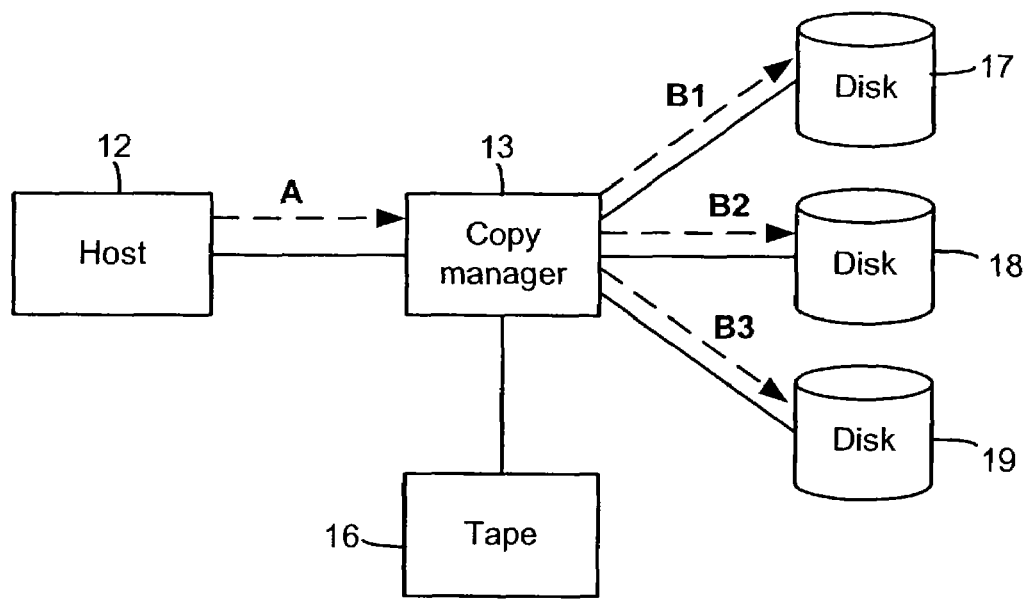
FIGS. 3A and 3B are a pair of diagrams illustrating the flow of extended copy commands and corresponding data flow in one embodiment.
Figure 3B:
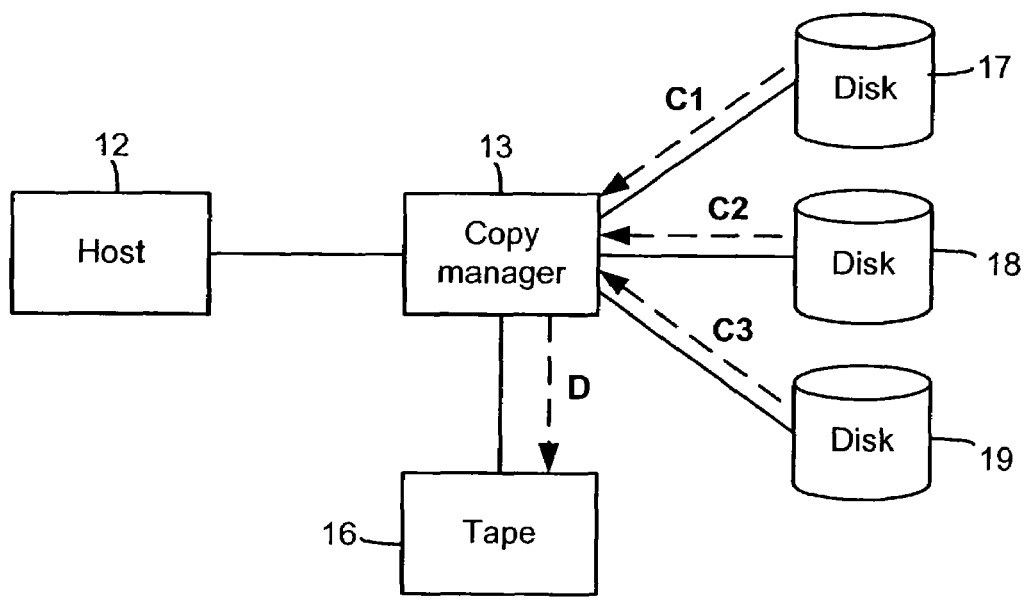

Referring to FIGS. 3A and 3B, a pair of diagrams illustrating the flow of extended copy commands and corresponding data flow are shown. FIGS. 3A and 3B depict the flow of commands and data through the system during a backup operation that is performed using extended copy commands. In this instance, data from all three devices 17-19 is backed up to sequential storage device 16.

Data flow A (shown in FIG. 3A) represents the issuance of extended copy commands from the host 12 to a copy manager 13. The copy manager can be implemented in a router, or in some other component of the SAN. Three different extended copy commands are issued in the depicted situation—one for each of devices 17-19 to be backed up. Each of the extended copy commands instructs the copy manager to back up data from one of the devices to the sequential storage device 16. When copy manager 13 receives each extended copy command, it constructs a corresponding series of commands that will be issued to the appropriate device to read data from it. The copy manager also constructs a series of commands that will be issued to sequential storage device 16 to write the devices' data to it. The read commands issued by the copy manager to each device are shown as data flows $B_1$, $B_2$ and $B_3$ in FIG. 3A. The data responsive to these read commands is shown as data flows $C_1$, $C_2$ and $C_3$ in FIG. 3B. Finally, the write commands issued by the router to the tape drive are shown as dataflow D (see FIG. 3B).

When the extended copy command is executed, the copy manager identifies the target devices and goes through the segment descriptors sequentially (in the order received). For each of the segment descriptors, the copy manager builds corresponding read commands to be issued to the source device and write commands to be issued to the destination device. When these read and write commands are issued to the respective devices, they serve to transfer data from the source device to the destination device.

If there is only one extended copy command that is being executed at a time, the copy manager simply receives the data from the source device and transfers the data to the destination device. If the data is being stored on a sequential storage device, the data is recorded on the storage device in the same sequence that it is received. In one embodiment, the data is received by the sequential storage device in blocks, so consecutive blocks are stored in consecutive (adjacent) locations in the device's storage medium. Then, when it is necessary to retrieve the data from the sequential storage device, a series of consecutive blocks corresponding to the desired data is read from the device.

It should be noted that the term "block," as used herein should be construed to include blocks of data that have any appropriate size and/or formatting. In fact, it is not necessary that all of the blocks have the same formatting, as long as the blocks can be delineated.

The situation becomes more complicated when there are multiple extended copy commands that are being executed at the same time. For example, multiple copy commands may be issued to the copy manager to transfer data from multiple devices to the same sequential storage device. These commands are executed in alternating time slices, so the transfers of data from different devices to the copy manager overlap. The copy manager then transfers the received data in an interleaved fashion to the sequential storage device.

This situation should be distinguished from concurrent extended copy commands as referenced in the NCITS T10 SPC-2 Extended Copy Command specification. In this specification, "—concurrent—" extended copy commands that have been issued and are pending at the same time are again executed in alternating time slices, but as commonly implemented, SPC-2 extended copy commands read from different source disks and write to different destination tape drives in an interleaved fashion.

Figure 4:
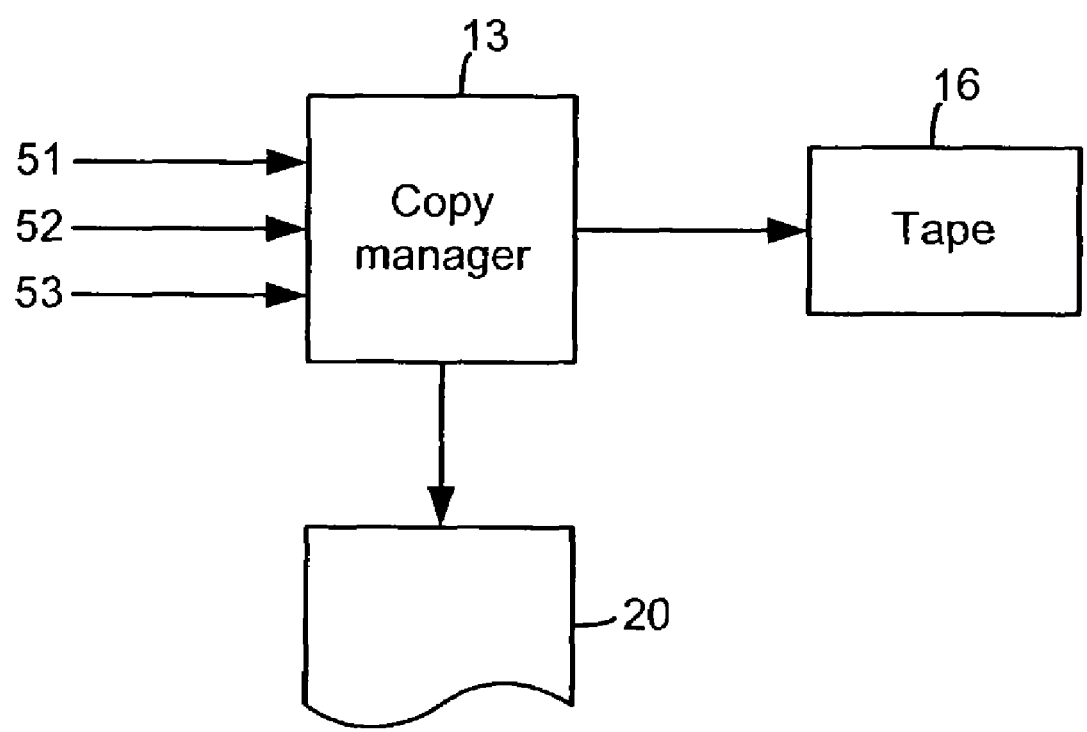
FIG. 4 is a diagram illustrating the multiplexing of the data streams resulting from different threads of execution of different extended copy commands is shown.

The present systems and methods deal with the situation in which the concurrently executed extended copy commands involve writes to the same sequential storage device. As noted above, the data received from different devices in this situation is interleaved. More specifically, the data is multiplexed. Referring to FIG. 4, a diagram illustrating the multiplexing of the data streams resulting from different threads of execution of different extended copy commands is shown.

Figure 5:
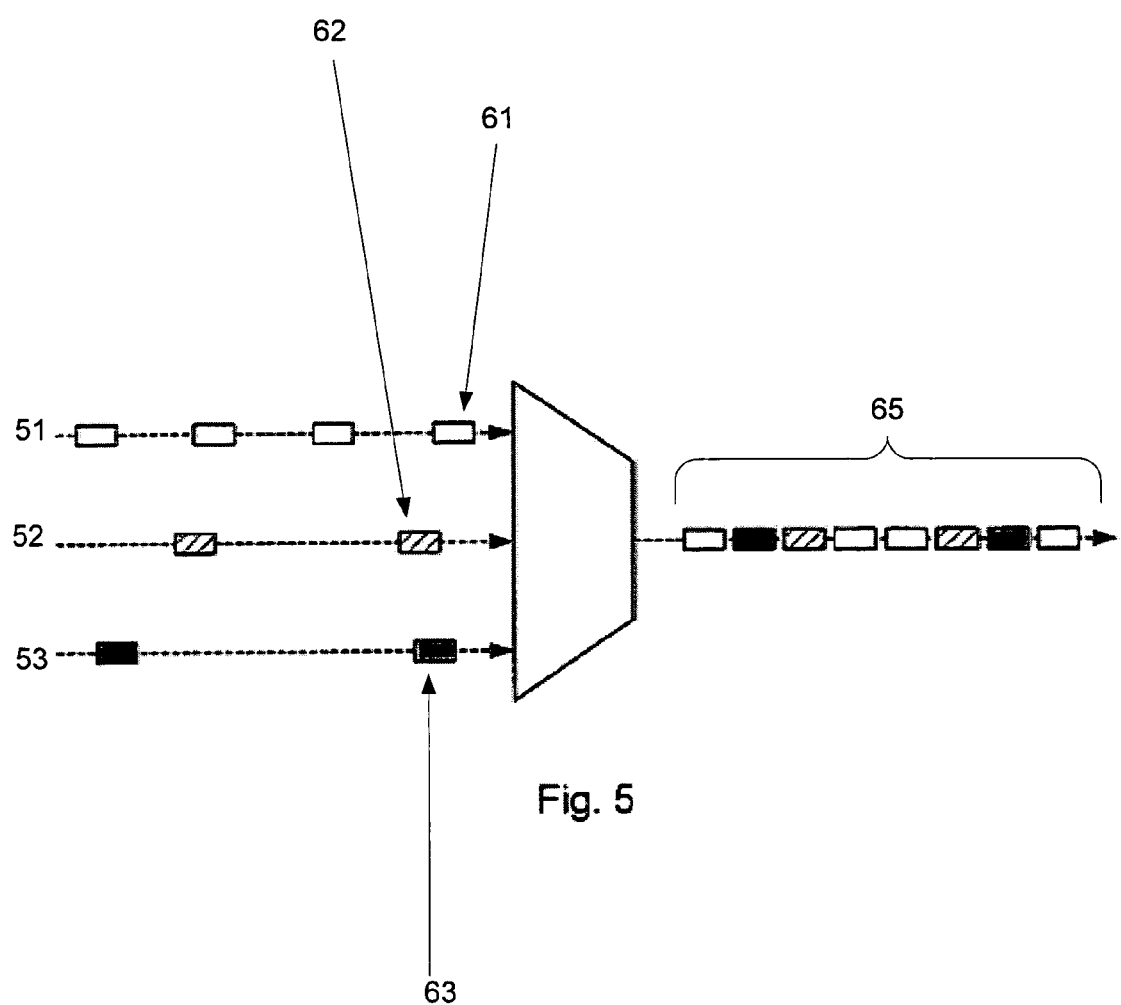
FIG. 5 is a diagram illustrating the manner in which blocks of data from different threads are multiplexed to form a single stream of blocks to be written to a sequential storage device.

FIG. 4 depicts three streams of data, 51-53. Each stream corresponds to a particular extended copy command which is concurrently executing in its own thread. As each thread executes, blocks of data are read from the corresponding device and transferred to the copy manager 13. The individual blocks of data are depicted in FIG. 5. The blocks corresponding to the different threads may arrive at the copy manager at different rates, and they are not synchronized with the blocks of the other threads.

Referring to FIG. 5, as the blocks of data 61-63 from the different threads 51-53 are received by the copy manager, they are multiplexed to form a single stream of blocks 65 and queued to be written to the sequential storage device. Because the blocks are randomly received, they are randomly intermingled. In other words, while all of the blocks corresponding to a given thread will be in order, the order in which the blocks alternate between the different threads is indeterminate. The number of consecutive blocks in the queue from a single one of the threads between blocks from other threads is also unknown.

Referring again to FIG. 4, as the blocks of data are written from the queue to sequential storage device 16, however, the order of the blocks is tracked. In one embodiment, this is done by logging the write commands to sequential storage device 16 (i.e., by writing corresponding entries to log 20). Each entry in the log 20 includes an identifier of the thread to which the corresponding blocks belong, as well as the number of blocks from that thread. Each entry in log 20 may also contain information that may be useful for performance or diagnostic analyses. For example, each entry may include a timestamp that identifies the time at which the data was received or written. This information could then be used to determine the rate at which the data transfer occurred.

It should be noted that that, in other embodiments, the order in which the blocks are stored on the sequential storage device may be tracked in a different manner. For example, rather than recording the number of consecutive blocks from a particular thread, each block may be logged separately. In other words, consecutive blocks from a particular thread may have consecutive entries in the log, each having the same thread identifier. In another embodiment, an identifier other than the thread identifier may be recorded with the entries in the log.

The primary purpose of logging the writes to the sequential storage device is to provide a mechanism for efficiently retrieving the recorded data. Although it is possible to read each of the individual recorded blocks of data to determine their respective origins, it is much more efficient to be able to simply index into the series of recorded blocks to find the particular blocks that are desired. The write log provides the information necessary to do this.

When it is desired to retrieve a portion of the data recorded to the sequential storage device from multiple threads, it is first necessary to identify which thread and which block (or blocks) of that thread contains the desired data. That block can then be identified in the write log. (As noted above, all of the blocks of a given thread are recorded in order.) Once the block is identified in the write log, it is only necessary to index into the recorded sequence of blocks to locate the desired block. (For example, the number of blocks that precede the desired block in the recorded series of blocks can be determined and this number of blocks can be skipped from the beginning of the series.) The desired block can then be read.

A restore operation using the write log can itself be implemented using extended copy commands. The host could read the write log and then construct an extended copy command having the following parameter list.

| Segment descriptor | Function |
| --- | --- |
| 1 | Space to block N |
| 2 | Read block N |
| 3 | Space to block N + I |
| 4 | Read block N + I |
| 5 | Space to block N + J |
| 6 | Read block N + J |

While it is possible to read the desired block of data from the sequential storage device without using the write log, this typically is not very efficient. For example, the nth block of stream Y can be retrieved by reading all of the preceding blocks, rather than simply skipping over them. If there are only relatively few blocks of data corresponding to stream Y, most of the resources used to retrieve the desired block of data will be wasted reading unwanted blocks. Clearly, this is inefficient.

It is also possible to read metadata in each of the blocks to identify them. When the desired block is found, it is identified and read from the sequential storage device. While this may be more efficient than reading the preceding data blocks in their entirety, it is still inefficient in that the identifying metadata for each of the preceding blocks must be read. When the write log is used to identify the location of the desired block, it is not necessary to read the metadata in order to identify the desired block.

Some of the embodiments of the invention contemplate utilizing a system of vendor unique commands to perform policy based functions. These may include functions such as initiating a log (possibly including an application-generated log identifier), retrieving a log (that is, sending it from the copy manager to the host), copying of a log to a storage medium (such as appending the log to the backup medium when the backup is complete), and clearing a log (erasing the log from copy manager memory). These log functions might be accomplished through purely vendor unique commands, or through a mix of vendor unique and Extended Copy vendor unique extensions.

In addition to the embodiments described above, there are numerous alternative embodiments. For example, while the write log described above records a thread/device identifier and a number of consecutive blocks corresponding to that thread, it is possible to record the identifier for each block recorded. It would still be possible to use this log to determine how many blocks to skip from the beginning of the recorded sequence in order to arrive at the location of the desired block.

In another alternative embodiment, the sequence of the recorded data blocks may be tracked by a mechanism other than the write log described above. For instance, a log may be generated from the blocks of data in queue to be written to the sequential storage device, since they are written to the sequential storage device in the order they are retrieved from the queue. In yet another embodiment, the order of the data blocks may be recorded as the blocks are received, assuming that the blocks are written to the sequential storage device in the order they are received. This last alternative is not preferred, however, as two or more blocks may be received at the same time.

Other alternative embodiments may comprise methods employed by the systems described above. For example, One embodiment of the invention is a method comprising generating a write log, wherein the write log identifies a sequence in which blocks of data corresponding to multiple write threads are stored on a sequential device, reading the log, identifying at least a portion of the blocks of data corresponding to one of the write threads and indexing to the location of the identified portion of the blocks of data in the sequence of blocks of data stored onto the sequential device according to the write log. Another embodiment comprises a method similar to that described above, but wherein the write log was previously generated, and the method comprises reading the log, identifying the desired data in the log, indexing to the location of the data on the sequential device as indicated in the log and retrieving the data from the sequential device.

It should be noted that the methodologies disclosed herein may be implemented in various combinations of software (including firmware) and hardware. The present application is therefore intended to cover software applications that include instructions for causing a computer or other data processor to perform the methods disclosed herein. These software applications may be embodied in any medium readable by such a computer or data processor, including floppy disks, CD-ROMs, DVD-ROMs, RAM, ROM, and the like. Likewise, a computer or data processor which is configured to execute such software applications, or which is otherwise programmed to perform the methods disclosed herein is intended to be covered by the present application.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for retrieving data from a sequential storage device on which blocks of data corresponding to multiple threads are stored in an intermingled fashion, comprising:
    reading a log, wherein the log identifies a sequence in which the blocks of data corresponding to the multiple threads are stored on the sequential storage device, wherein each thread corresponds to an Extended Copy command from a plurality of Extended Copy commands;
    identifying at least a portion of the blocks of data as corresponding to one of the multiple threads using the log;
    indexing to the location of the identified portion of the blocks of data in the sequence in which the blocks of data corresponding to the multiple threads are stored on the sequential storage device according to the log; and
    retrieving the identified portion of the blocks of data from the sequential storage device.

2. The method of claim 1, wherein indexing to the location of the identified portion of the blocks of data in the sequence comprises counting a first number of the blocks of data preceding the identified portion of the blocks of data in the log and advancing the first number of the blocks of data on the sequential storage device.

3. The method of claim 1, wherein the log includes indications of file marks in the stored blocks of data and wherein indexing to the location of the identified portion of the blocks of data in the sequence comprises counting a first number of file marks preceding the identified portion of the blocks of data in the log and advancing the first number of file marks on the sequential storage device.

4. The method of claim 3, further comprising retrieving the identified portion of the blocks of data from the sequential storage device.

5. The method of claim 1, further comprising storing the blocks of data on the sequential storage device and writing the log prior to reading the log.

6. The method of claim 1, wherein each entry in the log identifies a corresponding thread of the multiple threads and a number of the blocks of data stored consecutively on the sequential storage device.

7. The method of claim 6, wherein each thread of the multiple threads is identified by a corresponding device identifier.

8. The method of claim 1, wherein the log is stored on the sequential storage device and the log is read from the sequential storage device.

9. The method of claim 1, wherein the log is stored on a storage medium separate from the sequential storage device and the log is read from the separate storage medium.

10. A method for managing storage of blocks of data on a sequential storage device, wherein the blocks of data corresponding to multiple threads are stored on the sequential storage device in an intermingled fashion, comprising:
    storing a sequence of the blocks of data on the sequential storage device, wherein the blocks of data correspond to a multiple write threads of the multiple threads, wherein the blocks of data corresponding to different write threads of the multiple threads are intermingled on the sequential storage device and wherein each thread of the multiple thread corresponds to an Extended Copy command from a plurality of Extended Copy commands;
    recording the order in which the blocks of data are stored in a log, wherein the log identifies the write thread to which each block belongs such that a copy manager can index to a particular block of data without reading each of the preceding stored blocks of data or associated metadata;
    retrieving the particular block of data from the sequential storage device; and
    storing the log.

11. The method of claim 10, wherein recording the order in which the blocks of data are stored comprises recording entries corresponding to write commands in the log.

12. The method of claim 10, further comprising storing the log on the sequential storage device.

13. The method of claim 10, further comprising storing the log on a storage medium, which is separate from the sequential storage device.

14. The method of claim 10, further comprising identifying at least a portion of the blocks of data corresponding to one of the multiple threads, identifying the position of entries in the log corresponding to the identified portion of the blocks of data, and indexing to the location of the identified portion of the blocks of data corresponding to one of the multiple threads in the sequence of blocks of data stored on the sequential storage device based upon the identified portion of the blocks of data in the log.

15. A system for managing blocks of data on a sequential storage device, wherein the blocks of data corresponding to multiple threads are stored on the sequential storage device in an intermingled fashion, comprising:
    the sequential storage device configured to store intermingled blocks of data corresponding to the multiple threads, wherein each thread corresponds to an Extended Copy command from a plurality of Extended Copy commands;
    a copy manager coupled to the sequential storage device and configured to manage the retrieval of desired blocks of data from the sequential storage device; and
    a memory coupled to the copy manager and configured to store a sequence in which the blocks of data corresponding to the multiple threads are stored on the sequential storage device;
    wherein the copy manager is configured to identify the position of the desired blocks of data in the sequence stored in the memory using a log, to advance to a corresponding storage location on the sequential storage device without reading each of a preceding stored blocks of data or associated metadata, and to retrieve the desired blocks of data from the sequential storage device.

16. The system of claim 15, wherein the copy manager is further configured to store the sequence of the stored data blocks in the memory.

17. The system of claim 15, wherein the copy manager is configured to copy the blocks of data to the sequential storage device according to the plurality of extended copy commands.

18. The system Of claim 15, further comprising one or more hosts coupled to the copy manager, wherein the copy manager is configured to store the blocks of data on the sequential storage device according to the plurality of Extended Copy commands issued by one or more hosts.

19. The system of claim 18, further comprising a plurality of data sources, wherein the copy manager is configured to copy data from each of the plurality of data sources in a plurality of corresponding multiple threads.

20. The system of claim 15, wherein the copy manager is implemented in a switch fabric.

21. The system of claim 15, wherein the copy manager is implemented in a network attached device.

22. A software product comprising one or more instructions embodied in a medium readable by a data processor, wherein the instructions are configured to cause the data processor to execute the method comprising:
reading a log, wherein the log identifies a sequence in which blocks of data corresponding to multiple threads are stored on a sequential storage device, wherein each thread corresponds to an Extended Copy command from a plurality of Extended Copy commands;
identifying at least a portion of the blocks of data as corresponding to one of the threads using the log;
indexing to the location of the identified portion of the blocks of data in the sequence of blocks of data stored on the sequential device according to the log; and
retrieving the identified portion of the blocks of data from the sequential storage device.

* * * * *